United States Patent
Graf et al.

(10) Patent No.: US 10,464,416 B2
(45) Date of Patent: Nov. 5, 2019

(54) METHOD FOR OPERATING A DRIVE TRAIN FOR A MOTOR VEHICLE AND CORRESPONDING DRIVE TRAIN

(71) Applicant: AUDI AG, Ingolstadt (DE)

(72) Inventors: Christian Graf, Ingolstadt (DE); Michael Bär, Ingolstadt (DE); Michael Wein, Seubersdorf (DE); Martin Arndt, Ingolstadt (DE); Stefan Lehner, Ingolstadt (DE); Marc Baur, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 174 days.

(21) Appl. No.: 15/553,433

(22) PCT Filed: Feb. 18, 2016

(86) PCT No.: PCT/EP2016/053409
§ 371 (c)(1),
(2) Date: Aug. 24, 2017

(87) PCT Pub. No.: WO2016/135029
PCT Pub. Date: Sep. 1, 2016

(65) Prior Publication Data
US 2018/0043773 A1 Feb. 15, 2018

(30) Foreign Application Priority Data
Feb. 24, 2015 (DE) .......... 10 2015 002 296

(51) Int. Cl.
*F16D 48/06* (2006.01)
*B60K 17/35* (2006.01)

(52) U.S. Cl.
CPC .......... *B60K 17/3505* (2013.01); *F16D 48/06* (2013.01); *F16D 2500/10431* (2013.01);
(Continued)

(58) Field of Classification Search
CPC .......... F16D 48/06; F16D 2500/10431; F16D 2500/50293
See application file for complete search history.

(56) References Cited

U.S. PATENT DOCUMENTS

| 5,679,091 A | 10/1997 | Salecker et al. |
| 2004/0140174 A1* | 7/2004 | Kano .......... B60K 28/165 |
| | | 192/104 R |

(Continued)

FOREIGN PATENT DOCUMENTS

| CN | 1111005 A | 11/1995 |
| DE | 10301869 A1 | 7/2004 |

(Continued)

OTHER PUBLICATIONS

Office Action dated Feb. 2, 2019 in corresponding Chinese Application No. 201680011699.9; 17 pages.

(Continued)

*Primary Examiner* — Edwin A Young
(74) *Attorney, Agent, or Firm* — Maier & Maier, PLLC

(57) ABSTRACT

A method for operating a drive train for a motor vehicle, with at least one primary drive axle and at least one secondary drive axle, which are operatively connected to each other via a clutch to an adjustable transmission torque. At the same time it is provided that a vibration amplitude of a vibration of the drive train is determined and in a damping operation type of the drive train, the transmission torque is determined from the vibration amplitude and adjusted on the clutch.

10 Claims, 1 Drawing Sheet

(52) U.S. Cl.
CPC ............. *F16D 2500/30822* (2013.01); *F16D 2500/30825* (2013.01); *F16D 2500/3102* (2013.01); *F16D 2500/3108* (2013.01)

(56) References Cited

U.S. PATENT DOCUMENTS

| | | | | |
|---|---|---|---|---|
| 2005/0061573 A1* | 3/2005 | Mizuno | ............ | B60K 17/04 180/376 |
| 2015/0060230 A1* | 3/2015 | Neuberth | ............ | F16D 48/06 192/30 V |

FOREIGN PATENT DOCUMENTS

| | | |
|---|---|---|
| DE | 102006001468 A1 | 8/2006 |
| DE | 602004011172 T2 | 1/2009 |
| DE | 102008035556 A1 | 2/2010 |
| DE | 102011012593 A1 | 8/2012 |
| DE | 102011101168 A1 | 11/2012 |
| EP | 2067681 A1 | 6/2009 |
| GB | 497903 A | 12/1938 |
| WO | 2004/028849 A2 | 4/2004 |
| WO | 2004027285 A1 | 4/2004 |

OTHER PUBLICATIONS

Notification of Transmittal of Translation of the International Preliminary Report on Patentability dated Sep. 8, 2017, in connection with corresponding international application No. PCT/EP2016/053409 (6 pages).
Office Action dated Mar. 28, 2019 in corresponding German Application No. 10 2015 002 296.2; including partial machine-generated English language translation; 7 pages.
International Search Report and Written Opinion dated May 12, 2016 of corresponding International application No. PCT/EP2016/053409; 14 pgs.
German Examination Report dated Nov. 6, 2015 of corresponding application No. DE102015002296.2; 5 pgs.

* cited by examiner

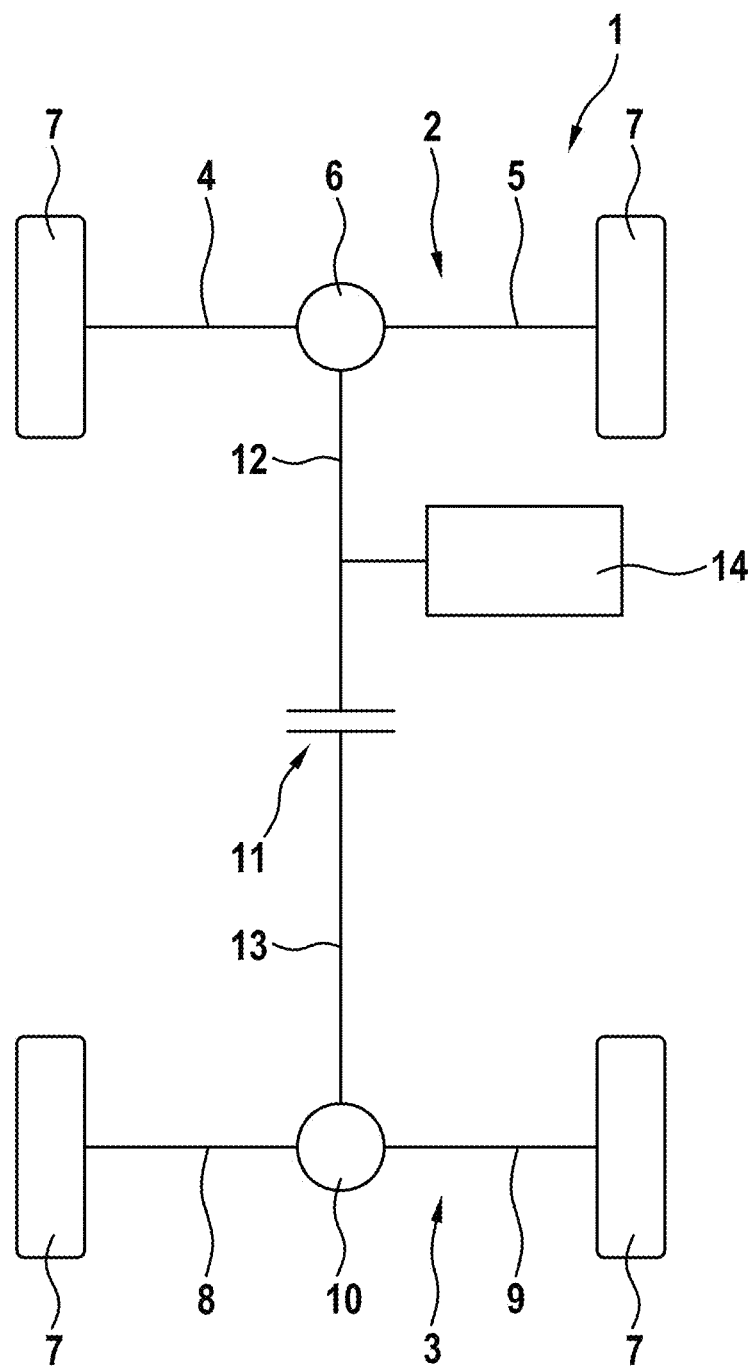

METHOD FOR OPERATING A DRIVE TRAIN FOR A MOTOR VEHICLE AND CORRESPONDING DRIVE TRAIN

FIELD

The invention relates to a method for operating a drive train for a motor vehicle provided with at least one primary drive axle and at least one secondary drive axle, which are operationally connected to a transmission torque. The invention further relates to a drive train for a motor vehicle.

BACKGROUND

The method is used to operate a drive train, wherein the operation is directed for example to driving a motor vehicle, in particular to acceleration. The drive train is intended for use in the motor vehicle, so that the invention relates also to a motor vehicle provided with a correspondingly equipped drive train. The drive train is equipped with at least one primary drive axle and the at least one secondary drive axle. These axles are operatively connected or at least can be operatively connected, wherein the transmission torque of the clutch is adjustable, in particular between the primary drive axle and the secondary drive axle via the clutch which transmits the torque.

The transmission torque can be in this case set between a minimum transmission torque and a maximum transmission torque. The minimum transmission torque equals for example zero, but it can be also different from zero, in particular greater than zero. The maximum transmission torque depends usually on the design of the clutch; however, it is preferably at least as large, preferably larger than a drive torque that can be provided by a drive apparatus or a drive assembly of the drive train which is or which should be transmitted via the clutch. The maximum transmission torque is provided for example with a clutch overpressure.

Under a drive torque is preferably to be understood the torque that is in fact applied to the clutch, which can be different from the torque that is generated by the drive apparatus or the drive assembly. This can be the case for example with a transmission that is provided with an operative connection between the drive apparatus and the clutch, in particular a shift transmission, when a transmission ratio that is different from one is present or engaged. For the determination of the torque applied at the clutch should be in this respect taken into account the transmission ratio that is present for example between the drive apparatus or the drive assembly on the one hand and the drive clutch on the other hand.

The primary drive axle is an axle of the drive train or of the motor vehicle which is impacted constantly when a torque that is directed at one of the drives of the motor vehicle by this torque or at least by a part thereof. The secondary drive axle can be impacted selectively by the torque or at least by a portion of the torque. For this purpose is provided the clutch which is present between the primary drive axle and the secondary drive axle. In a first operating state of the clutch, the secondary axle is fully decoupled from the primary axle. Accordingly, the motor vehicle is operated only by means of the primary axle. The transmission of a torque from the primary drive axle to the secondary drive axle therefore does not take place. The transmission torque thus in this case equals zero.

In another operating state of the clutch, the transmission torque is greater than zero so that the transmission torque is transmitted from the primary drive axle to the secondary drive axle. In this case, the secondary drive axle also contributes to the driving of the motor vehicle. The motor vehicle or the drive train is provided according to the present embodiments at least temporarily with a plurality of driven axles, in particular at least with two driven axles, but driving with only axle, namely the at least one primary axle, is also enabled, in particular with exactly one single primary drive axle.

For example, the primary drive is connected permanently and/or rigidly to a drive apparatus of the motor vehicle or of the drive train. The drive apparatus is in this case preferably provided with at least one drive assembly, for example an internal combustion engine, and/or an electric engine, as well as with a starting clutch. The primary drive axle is now in particular operatively connected or can be operatively connected via the starting clutch to the drive assembly, while an operative connection is present between secondary drive axle and the drive assembly preferably only with the primary drive axle, which is to say overall with a clutch that is present as the primary drive axle and the starting clutch, or at least only via the clutch.

The clutch can be for example designed as a friction clutch, in particular as a lamellar clutch, for example a lamellar interlock clutch. The maximum transmissible torque of the clutch is adjusted so that it can be controlled and/or regulated by an actuating mechanism or an actuator. As long as the clutch slip is different from zero, corresponding to a normalized difference between the input and output rotational speed of the clutch, the actually transmission torque will also correspond to the torque set by the actuating mechanism. As long as the clutch slip equals zero, the amount of the actually transmission torque can no longer be determined. Only the maximum of the transmittable torque is known according to the set torque which can be referred to as transmission torque.

If the transmission torque is further increased with an already small clutch slip or with a clutch slip of zero, the transmission torque will be further increased, which is why this is referred to due to the high pressure force on the clutch as a clutch overpressure, in particular in the case of the lamellar clutch. The clutch overpressure is usually provided to prevent or reduce clutch slip, in particular with a rapid change of the load. Similar load changes can occur for example as a result of road changes. However, the clutch overpressure has disadvantages. On the one hand, the actuating mechanism of the clutch uses more energy and generates under certain circumstances noises which can be perceived by the driver as an acoustic burden. Moreover, an unnecessary load is put on the actuating mechanism, which has an influence on its lifespan. Finally, the determination of the torque that is in fact transmitted can be achieved only with a low precision because the range of the values in which it is located is increased.

By decoupling the secondary axle, savings can be realized with respect to the consumption of energy by the drive train. These savings are particularly high when the clutch is provided between the primary drive axle and a cardan shaft of the drive train by means of which the primary drive axle and the secondary drive axle can be mutually connected to each other. With such an arrangement of the clutch, the cardan shaft can be also decoupled from the primary drive axle in addition to the secondary drive axle, so that no losses can occur at this location.

The more frequently only the primary drive axle is driven, which is to say that the secondary drive axle is decoupled from the primary drive axle, the lower will be the collective load or the torque level at the secondary axle. Accordingly, this axle or a secondary train drive provided with a secondary drive axle can have a smaller design, whereby on the one hand the weight of the drive train is reduced, while in addition the construction costs can be also reduced. Overall, decoupling of the secondary drive axle from the primary drive axle thus results in some advantages.

The secondary drive train is provided in addition to the secondary drive axle for example with the cardan shaft and/or with a transmission that is provided between the secondary drive axle and the cardan shaft, for example with a differential gear or with an axle differential gear. The gear can thus include at least one ring gear, which is preferably connected to the cardan shaft or attached to it.

However, the smaller design referred to above of the secondary drive train can lead to vibrations of the drive train, in particular with an acceleration of the motor vehicle, for example from the state when the motor of the vehicle is started.

These drive vibrations can lead to acoustic burdens. Furthermore, they can also have a negative influence on parameters such as climbing ability, trailer load and/or similar parameters. In order to adequately suppress these vibrations of the drive train, for example a Hardy disk in installed. This is referred to in the document GB 497 900.

SUMMARY OF THE DISCLOSURE

It is an object of the invention to propose a method for operating a motor vehicle which has advantages over other methods, in particular because it enables damping of the drive train vibrations.

This is achieved according to the disclosure. In this case it is provided that a vibration amplitude of a vibration of the drive train is determined from the vibration amplitude of the torque and adjusted on the clutch. Next, it is determined whether the drive train or the secondary drive train is vibrating so that the torque transmitted via the secondary drive axles is superimposed with a vibration. In this case, the vibration amplitude of this vibration is determined, either as an absolute value—or, alternatively—as a relative value which relates to the torque that is transmitted via the secondary drive axle, preferably according to the transmission torque.

If the drive train is operating in the damping mode, then the transmission torque will be next determined from the vibration amplitude and adjusted on the clutch. The transmission torque is thus adjusted or corrected in this respect based on the vibration amplitude.

For example, the transmission torque is determined next, for instance from an input or from a specification of the torque by the driver and/or from a driver assistance device. After that, the transmission torque determined in this manner on the basis of the vibration amplitude is matched and subsequently adjusted on the clutch. For example, the overpressure of the clutch is determined from the overpressure torque and adjusted.

Instead of the overpressure torque, however, the clutch overpressure can be also determined directly from the vibration amplitude and adjusted on the clutch. Furthermore, it can be provided that pre-control of the transmission torque or of the clutch overpressure takes place, in particular based on the drive torque.

It is preferred when the transmission torque is determined from the vibration amplitude in such a way that it subsequently corresponds to the target transmission torque and/or at the most equals the maximum transmission torque. Ideally, the transmission torque is thus between the target transmission torque and the maximum transmission torque. It is particularly preferred when the transmission torque is significantly greater than the target transmission torque. For example, relative to the difference between the target transmission torque and the maximum transmission torque, it is at least 10%, at least 20%, at least 30%, at least 40% or at least 50% greater than the target transmission torque. Accordingly, sufficient reserves are always present in the transmission torque in order to prevent clutch slip, at least for the most part.

The target transmission corresponds for example to a maximum torque that can be lowered via the maximum reducible torque of the secondary drive axle, or that is greater than this. The maximum reducible torque can be determined for example from the relationship $$M_{Axle} = F_{Z,\ Axle} \cdot \mu_x \cdot r_{dyn}$$

wherein $M_{Axle}$ is the maximum reducible torque, $F_{Z,\ Axle}$ is the axle load, $\mu_x$ is the road friction coefficient value and $r_{dyn}$ is the dynamic wheel diameter of the wheels of the secondary drive axle.

The target transmission torque and in this respect the transmission torque can be thus preferably reduced at the most to the maximally reducible torque. This reduction makes it possible to achieve that the wheel slip is reduced at the secondary drive axle, so that the road friction coefficient or the adhesion coefficient between the wheel and the roadway is improved, in particular by damping the vibrations within the drive train.

In this case it can be provided that the maximally reducible torque is determined by using at least one of the following variables: an axle load of the secondary drive axle, a roadway friction coefficient and a dynamic wheel diameter of a wheel of the secondary drive axle and a transmission ratio between the clutch and the secondary drive axle. The axle load $F_{Z,Axle}$, the road friction coefficient $\mu_x$ and the dynamic wheel diameter $R_{dyn}$ were already mentioned above. In addition, the maximally reducible torque or the target transmission torque can be included in the transmission ratio. This is assigned for example to a transmission which is provided between the clutch and the secondary axle.

It is particularly preferred in a further embodiment of the invention when the roadway friction coefficient is determined from a longitudinal acceleration of the motor vehicle. One or several sensors may be used in order to determine the current roadway friction coefficient. For example, a longitudinal acceleration sensor is used for such a sensor. In particular, those accelerations that occur during the maximum longitudinal acceleration in an acceleration operation are determined. The roadway friction coefficient results are determined for example at least approximately from a division of the maximum longitudinal acceleration by the gravitational constant g. This estimated roadway friction coefficient can be used for the calculation of the target transmission torque.

However, such a procedure cal lead to inaccuracies, in particular when the motor vehicle is located on a slope. In this case, the longitudinal acceleration contains a portion which is caused by the gravitational force acting on the motor vehicle. Accordingly, the longitudinal acceleration determined by the longitudinal acceleration sensors does on in each case correspond to the longitudinal acceleration of the vehicle that is in fact present.

In addition or alternatively, one or several optical sensors can be of course also used in order to avoid the inaccuracies mentioned above for determining the axial load of the secondary drive axle.

According to another similar design of the invention, it is provided that the clutch is designed as a lamellar clutch and the transmission torque is adjusted by matching it to the pressing force of the lamellar clutch. Such a design of the clutch has been already mentioned above. The lamellar clutch is for example used as a lamellar interlock transmission clutch. With a corresponding matching or an adjustment of the pressing force, the desired transmission torque can be set at the lamellar clutch.

In another embodiment of the invention it is provided that a primary rotational speed and a secondary rotational speed are transformed based on a yaw rate of the motor vehicle to a center of gravity of the motor vehicle. Under certain circumstances, in particular when the motor vehicle drives through a curve, there may be differences between the rotational speed of the primary drive axle, which is to say the primary axle rotational speed, and the rotational speed of the secondary drive axle, which is to say the secondary axle rotational speed. For example, a front axle of the motor vehicle will in this case have a higher rotational speed than the rear axle of the motor vehicle. In this case, the primary drive axle can correspond to the front axle and the secondary drive axle can correspond to the rear axle or vice versa.

In order to still make it possible to obtain a reliable determination of the vibration amplitude of the drive train, the transformation of the primary rotational speed and of the secondary rotational speed is carried out.

This takes place on the basis of the yaw rate of the motor vehicle which is measured for example by means of a yaw rate sensor. In addition to the gear rate, for example a distance of the respective drive axle and/or the distance of the wheels provided on the respective axle to the center of gravity of the motor vehicle is used.

In a particularly preferred embodiment of the invention it is provided that within a predetermined time period, in particular during a period of ongoing movement, a maximum value and a minimum value of a rotational speed difference is determined between the primary rotational speed and the secondary rotational speed. During the time period of the measurement, the rotational speed difference is thus determined continuously or at intervals between the rotational speed of the primary axle and the rotational speed of the secondary axle. The maximum value and the minimum value are thus determined so that they correspond at the end of the measuring period to the maximum or minimum rotational speed that occur during the measuring period.

For example, the maximum value and the minimum value are reset prior to or at the beginning of the measuring period, which is to say to an output value. If the momentarily present rotational speed difference exceeds during the measuring time period the maximum value, it will be set to be equal to the rotational speed difference. On the other, if the momentarily present rotational speed difference is smaller than the minimum value, the minimum value will be set to the rotational speed difference. The length of the measuring time period can be selected for example as a constant length.

In particular, a measuring time period that is moved along is used during the determination of the maximum value and of the minimum value. This procedure is referred to as "moving horizon". In this case, the values for the rotational speed of the primary axle and rotation speed of the secondary axle are written to a storage unit, so that a corresponding number of values is thus determined. The storage device is thus operated as a FIFO storage unit (FIFO: "First In-First Out"). The size of the memory device or buffer is in this case selected in such a way that the values occurring during the measuring period can be fully stored in it.

According to another embodiment of the invention, the length of the measuring period is determined from the course of the rotational speed of the primary axle and from the course of the rotational speed of the secondary axle. The length of the measuring time period is selected for example in such a way that it comprises at least one full vibration period of the drive train. The length of the measuring time period thus corresponds to at least one potential duration of the vibration. For example, both the rotational speed of the primary axle and the rotational speed of the secondary axle are used in the form of their respective courses during the measuring period and they can be maintained or stored with intermediate storage.

For example, the end of the measuring time period is detected and its length is therefore determined when the rotational speed difference described above between the rotational speed of the primary axle and the rotational speed of the secondary axle is increased again from the minimum value or conversely, if it is decreased again from the minimum speed. In order to ensure that a complete vibration is contained in the measuring time period, it can be also provided that the measuring time period ends and its length is therefore determined when the rotational speed difference corresponds to twice the minimum or maximum amount. The duration of the vibrations can be determined on the one hand from the maximum value, and from the minimum value it can then be derived for example with the course of the rotational speed of the primary axle, as well as the amplitude of the vibrations that can be derived on the other hand with the course of the rotational speed of the secondary axle.

In a preferred further development of the invention it is provided that when a maximum threshold value is exceeded by a maximum value and at the same time a minimum value is below a minimum threshold value, the minimum value is changed to the damping mode of operation. The damping mode of operation described in the introduction is in this respect carried out only when both the maximum threshold value is exceeded by a maximum value and the minimum value is below the minimum value threshold at the same time. When the maximum threshold value is exceeded, clutch slip occurs, but not necessarily with a vibration to be damped.

Immediately after changing to the damping mode of operation, it can be provided that the transmission torque is only matched to a limited gradient. This means that the torque gradient with which the change of the transmission torque occurs is limited to a maximum gradient. This is preferably selected in such a way that the vibrations are at least not further amplified.

With a targeted matching of the transmission torque to the vibration amplitude, which usually leads to a reduction of the transmission torque and therefore to a reduction of the overpressure of the clutch, micro-slipping is generated in the clutch, which in turn leads to friction and therefore to damping of the vibration. The transmission torque is in this case reduced only to the extent that although the reduced damping is achieved, the positive halve-waves of the vibration which correspond to the clutch slip remain as small as possible. A high robustness of driving can thus be achieved in this manner. In addition, a strong acceleration of the motor vehicle is achieved without causing an undesired clutch slip.

The maximum threshold value is preferably different from the minimum threshold value, in particular it is greater.

In another embodiment of the invention it is provided that the operation is switched to the damping operation type only when a driving speed is smaller than or equal to the limiting speed value and/or a temperature is smaller than a limiting temperature value. As was already explained, the vibrations of the drive train occur usually with an acceleration of the motor vehicle, in particular during the start-up operation. In this respect, the damping operation type must be performed only with low driving speeds. The limiting value is thus determined for this purpose for the speed, for example in a range from 10 km/h to 100 km/h, in particular from 20 km/h to 90 km/h, while the upper limit of 50 km/h is particularly preferred. The change in the damping operation type is allowed only when the driving speed corresponds to or is below the speed limiting value.

Additionally or alternatively, the temperature can be used as a criterion. The operation is then switched to the damping operation type only when its value is lower than the temperature limiting value. The temperature is for example a clutch temperature, in particular the clutch lamella temperature of the lamellas of the clutch, or an operating means temperature of an operating means of the clutch. As an operating means can be used for example a hydraulic fluid and/or a lubricant. It goes without saying that several or all of the mentioned temperatures can be used, wherein preferably several temperature limiting values which are different from each other are used. Additionally or alternatively, it is ascertained whether the clutch lamellar temperature is lower than a first temperature limiting value and whether the operating means temperature is lower than a second temperature limiting value. Only when both conditions are fulfilled is a change to the damping operating type permitted.

According to a particularly preferred embodiment of the invention it is provided that when the maximum value is below the maximum threshold value and/or the minimum value is below the maximum threshold value, the operation is switched to the normal operation type. In the normal operation type, the transmission torque corresponds for example to a preset torque. This means that vibration amplitude is not determined or corrected based on this value. If the above named conditions are fulfilled, it can be concluded from this that although a clutch slip is present in the clutch, the amplitude of the vibration is not too large. Accordingly, no further (or stronger) damping needs to be performed. Additionally or alternatively, it can be provided that the operation is changed to the normal operation type when the driving speed is higher than the speed limiting value and/or the temperature is higher than the temperature limiting value.

When switching is performed from the damping to the normal operation type, it can be provided that the transmission torque is only matched to a limiting torque gradient. As was already described above, this means that the torque gradient with which the changed of the transmission torque is carried out is limited to a maximum torque. This is preferably selected in such a way that the vibrations are at least not amplified, which is to say that they are not incited again.

Furthermore, in a preferred embodiment of the invention it can be provided that the transmission torque is determined by means of a controller, in particular a PI controller, so that it is determined from the vibration amplitude, wherein the vibration amplitude is determined from the minimum value and from the maximum value, in particular from the sum of the minimum value and the maximum value. In this case it is for example provided that the controller regulates the vibration amplitude in the direction of a smaller value, in particular zero. For this purpose it can be provided that the controller reduces the transmission torque more with a greater amplitude than with a smaller amplitude. The larger the vibration amplitude, the more controller reduces the transmission torque, or the smaller is the transmission torque that will be selected. The vibration amplitude is in this case a function of the minimum value and of the maximum value. It is particularly preferred when the vibration amplitude corresponds to the sum of the minimum value and the maximum value.

Finally, it can be provided in another embodiment of the invention that the transmission amplitude is adjusted before the adjustment on the clutch by means of a vibration offset, wherein the vibration offset is determined from the minimum value and from the maximum value, and wherein a smaller transmission torque is selected with a greater transmission torque. The vibration offset can thus be used in addition to the vibration amplitude as an input variable of the controller. Alternatively, it is of course also possible to determine first the transmission moment by means of the controller, for example based on the vibration amplitude, and then to correct the transmission torque determined in this manner on the basis of the vibration offset.

The vibration offset will also determine the vibration amplitude from the minimum value and from the maximum value. For example, the vibration amplitude corresponds to the difference between the minimum value and the maximum value or vice versa. The vibration offset can be obtained from the sum of the minimum value and the maximum value. The vibration offset in this respect specifies a medium value of the offset of the primary axle rotational speed and the secondary axle rotational speed from zero. The greater the vibration offset, the more the vibration offset differs from zero, and the greater is also the amount of the positive half wave in the vibration. Accordingly, a greater transmission torque must be selected to reduce or to completely remove the clutch slip indicated by the presence of the half waves. Conversely, the smaller the transmission torque offset that is selected, the smaller will be also the vibration offset, which means that the deviation of the vibration offset from zero will be further in the negative direction because the smaller clutch slips allows for a stronger damping.

The invention further relates to a drive train for a motor vehicle, in particular for carrying out the method according to the present embodiments, provided with at least one primary drive and at least one secondary drive which are mutually operatively connected to an adjustable transmission torque. At the same time, it is provided that the drive train is designed to detect a vibration amplitude of a vibration of the drive train and to determine in a damping operation type of the drive train the transmission torque from the vibration amplitude and set it to the clutch.

The advantages of such a procedure or of such design of the drive train have been already discussed. Both the drive train and the method can be further developed according to the embodiments mentioned above, so that reference is made to them in this respect.

BRIEF DESCRIPTION OF THE DRAWING

The invention will be next described in more detail with reference to the drawing, without limiting the invention. The single FIGURE shows:

FIG. 1 shows a schematic representation of a drive train for a motor vehicle.

DETAILED DESCRIPTION OF THE DRAWING

FIG. 1 shows a schematic representation of a drive train 1, which is for example a part of a motor vehicle, not shown. The drive train is provided with a primary drive axle 2 and with a secondary drive axle 3. The primary drive axle is provided for example with sub-axles 4 and 5, which are operatively connected to each other via an axle differential 6. On each sub-axle 4, 5 is provided a wheel 7. Analogously, the secondary drive axle 3 is provided with sub-axles 8 and 9 which are mutually connected with one another with an operative connection via an axle differential 10. On the sub-axles 8 and 9 are also provided wheels 7.

The primary drive axle 2 and the secondary drive axle 3 are operatively connected via a clutch 11 to an adjustable transmission torque. For example, the sub-axles are in this case provided as output shafts of the respective axial differential 6 or 10, while input shafts 12, 13 of the axial differential can be mutually coupled to one another by means of the clutch 11.

The drive train is further provided with a drive device 14. This device is equipped for example with a drive assembly, not shown here, for example an internal combustion engine and/or an electric engine. The drive device 14 can be further equipped with a starting clutch (not shown here). The drive device 14 is preferable operationally connected in a permanent manner to the primary drive axle 2 or to the corresponding input shaft 12. An operative connection between the drive device 14 and the secondary drive axle 3 is provided only via the clutch 11. This means that the drive train 1 or the corresponding motor vehicle are equipped as a permanently driven axle, in particular the primary drive axle 2, and with an axle that is driven only some of the time, in particular a secondary drive axle 3.

During the driving operation of the drive train 1, a specified transmission torque is set at the clutch 11. This torque is determined in at least one damping operation type of the drive train 1 from a vibration amplitude of a vibration of the drive train 1. For this purpose, this vibration amplitude is determined at the same time or in advance. The transmission torque is in this case selected in such a way that the vibration is damped or reduced without having to worry about negative influences on the driving conduct of the motor vehicle.

With such an approach, the traction of the motor vehicle is improved, in particular during an acceleration, in particular when the motor vehicle is started. At the same time, the presence of an excessively high transmission torque at the clutch 11 or a corresponding clutch overpressure is reduced, so that the overall energy consumption of the drive train 1 can be reduced. In order to determine the oscillation amplitude of the oscillation of the drive train 1, for example a maximum value and a minimum value of a rotational difference is determined during a specified period of time between a rotational speed of the primary drive axle 2 and a rotational speed of the secondary drive axle 3.

If the maximum value now exceed a maximum threshold value and at the same the minimum value is below a minimum threshold value, the operation will be switched to a damping operation type (or it will be maintained in it) and the transmission torque will be determined from the vibration amplitude as described above. On the other hand, if the identified conditions are not fulfilled, the operation is switched to or carried out as a normal operation. It is particularly advantageous when the operation is then switched to a damping operation type only when the driving speed of the vehicle is smaller than or equal to a speed limiting value. If this condition is not fulfilled, the normal operation type is carried out or the operation is switched to this operation type.

The invention claimed is:

1. A method for operating a drive train for a motor vehicle with at least one primary drive axle and at least one secondary drive axle which are mutually operatively interconnected via a clutch with an adjustable transmission torque, the method comprising:
   determining a vibration amplitude of a vibration of the drive train and adjusting a clutch overpressure on the clutch in a damping mode of the drive train; and
   determining the clutch overpressure from the transmission torque determined from the vibration amplitude or directly from the vibration amplitude.

2. The method according to claim 1, wherein a primary rotational speed and a secondary rotational speed are transformed on the basis of a yaw rate of the motor vehicle to a center of gravity of the motor vehicle.

3. The method according to claim 2, wherein a length of a measuring time period is determined from a course of the rotational speed of the primary axle and from a course of the rotational speed of the secondary axle.

4. The method according to claim 1, wherein within a predetermined time period, a maximum value and a minimum value of a rotational speed difference are determined between a rotational speed of the primary axle and a rotational speed of the secondary axle.

5. The method according to claim 4, wherein when a maximum threshold value is exceeded by the maximum value and at the same time the minimum value is below a minimum threshold value, an operation is switched to a damping operation type.

6. The method according to claim 4, wherein the transmission torque is determined by a controller, from the vibration amplitude, wherein the vibration amplitude is determined from the minimum value and from the maximum value.

7. The method according to claim 4, wherein the transmission torque is adjusted before the adjustment on the clutch (11) on the basis of a vibration offset, wherein the vibration offset is determined from the minimum value and from the maximum value, and wherein the greater the vibration offset, the greater the transmission torque that is selected.

8. The method according to claim 1, wherein a normal operation is switched to a damping operation only when a driving speed of the vehicle is lower than or equal to a speed limiting value and a clutch temperature is lower than a temperature limiting value.

9. The method according to claim 1, wherein when a maximum value is below a maximum threshold value and when a minimum value is below a minimum threshold value, the drive train is switched to a normal operation.

10. A drive train for a motor vehicle, comprising:
   at least one primary drive axle and at least one secondary drive axle, which are operatively connected to each other with a clutch with an adjustable torque, wherein the drive train determines a vibration amplitude of a vibration of the drive train and a clutch overpressure is adjusted on the clutch in a damping mode of the drive train, and the drive train determines the vibration amplitude of a transmission torque from the vibration amplitude in the damping mode of the drive train, wherein the clutch overpressure is determined from the transmission torque determined from the vibration amplitude or directly from the vibration amplitude.

\* \* \* \* \*